United States Patent [19]
Welch et al.

[11] Patent Number: 5,505,811
[45] Date of Patent: Apr. 9, 1996

[54] SIDEWALL APPLICATOR FOR HEAT FUSION OF A FITTING TO A PLASTIC PIPE

[75] Inventors: Joseph Welch, Jenks; Kenneth K.-Y. Chan, Tulsa, both of Okla.

[73] Assignee: TDW Delaware, Inc., Wilmington, Del.

[21] Appl. No.: 259,197

[22] Filed: Jun. 13, 1994

[51] Int. Cl.⁶ ............................................. B32B 31/00
[52] U.S. Cl. ................... 156/358; 156/359; 156/379.8; 156/499; 269/33; 269/34
[58] Field of Search ........................... 156/358, 359, 156/379.8, 499, 556; 269/30, 32, 33, 34, 41

[56] References Cited

U.S. PATENT DOCUMENTS

| | | | |
|---|---|---|---|
| 3,616,024 | 10/1971 | Windle | 156/257 |
| 3,729,360 | 4/1973 | McElroy | 156/499 |
| 3,743,566 | 7/1973 | Louthan et al. | 156/499 |
| 3,820,773 | 6/1974 | Aizawa | 269/32 |
| 3,966,528 | 6/1976 | Christie | 156/499 X |
| 4,092,205 | 5/1978 | Mieszczak | 156/499 |
| 4,338,712 | 7/1982 | Dearman | 29/281.6 |
| 4,445,677 | 5/1984 | Hansen et al. | 269/41 |
| 4,533,424 | 8/1985 | McElroy | 156/378 |
| 4,542,892 | 9/1985 | Jenkins et al. | 156/499 X |
| 4,556,207 | 12/1985 | Thompson et al. | 156/499 X |
| 4,957,570 | 9/1990 | Goldner | 269/41 |

*Primary Examiner*—David A. Simmons
*Assistant Examiner*—Paul M. Rivard
*Attorney, Agent, or Firm*—Head, Johnson & Kachigian

[57] ABSTRACT

A sidewall applicator for heat fusion of a fitting to a plastic pipe has first and second spaced apart paralleled main shafts each having a lower end that is supported by rounding shells to the exterior of the plastic pipe so that the main shafts are supported in a plane that includes the pipe tubular axis. A housing is slidably supported by and positioned between the main shafts. A hydraulic displaceable force piston extends from the housing in the direction towards the pipe. A fitting holder is removably attached to the force piston which, in turn, removably supports the plastic fitting to be secured to the pipe. Brake arms are pivotally supported to the housing, each having an outer end that releasably engages one of the main shafts. An actuator piston supported in the housing is in closed communication with a fluid filled passageway within the housing, the fluid passageway being in communication with the brake pistons and the force piston. A threadably extended shaft engages the actuator piston and has a knob so that by rotating the knob the force piston is displaced applying hydraulic pressure to the fluid passageway to, in turn, displace the brake pistons and the force piston to simultaneously lock the housing to the shafts and to drive the force piston downwardly to force a fitting held thereby into engagement with the pipe.

9 Claims, 7 Drawing Sheets

SIDEWALL APPLICATOR FOR HEAT FUSION OF A FITTING TO A PLASTIC PIPE

CROSS-REFERENCE TO RELATED APPLICATIONS

This application is not related to any pending patent applications.

CROSS-REFERENCE TO MICROFICHE APPENDIX

This application is not related to any microfiche appendix.

BACKGROUND OF THE INVENTION

This invention relates to an apparatus for fusing a plastic fitting to a plastic pipe. A known means of attaching a thermoplastic component to a thermoplastic pipe is by heat fusion. The term "heat fusion" as used herein means heating mating surfaces of a fitting and a portion of the exterior surface of a plastic pipe and while these surfaces are in molten states, to join the surfaces together under applied pressure and holding pressure against the components until the joined surfaces cool and thereby fuse to each other.

The butt fusion of one length of plastic pipe to another is a well known technique. This invention relates not to butt fusion wherein one length of pipe is joined to another but to the fusion of a fitting to the sidewall of a plastic pipe. For this purpose, an apparatus is attached to the pipe to afford means of positioning a fitting in proper relationship to the pipe and to move the fitting and the pipe into engagement with each other while heated surfaces cool to fuse the fitting and the pipe together.

For background information relating to the attachment of fittings to the sidewall of a plastic pipe, reference may be had to the following previously issued United States Patents:

| U.S. PAT. NO. | INVENTOR | TITLE |
| --- | --- | --- |
| 3,616,024 | Windle | Method and Apparatus For Welding Heat Sealable Pipes |
| 3,743,566 | Louthan et al | Apparatus For Joining A Plastic Fitting To A Plastic Pipe |
| 4,338,712 | Dearman | Welding Fixture For Use In Joining Two Tubular Members |
| 4,445,677 | Hansen et al | Clamping Apparatus For Plastic Pipe |
| 4,533,424 | McElroy | Pipe Fusion Apparatus With Load Cell For Attaching Side Wall Fittings |

BRIEF SUMMARY OF THE INVENTION

This invention provides a sidewall applicator for heat fusion of a plastic fitting to the exterior cylindrical surface of a plastic pipe in which a surface of the fitting and a portion of the cylindrical surface of the pipe in the area thereof to which said fitting is to be attached is heated so that the surfaces are in a molten state. The applicator includes a first and second main shaft each having a lower end. An elongated rounding base is provided having, in cross-section perpendicular to its length, a semi-circular interior surface of a dimension conforming to the nominal external diameter of the pipe. The rounding base has opposed first and second ends. The rounding base is supported in contact with and beneath a portion of the pipe that is to receive a fitting. A first upper rounding shell is pivotally attached to the rounding base adjacent the first end thereof and, in like manner, a second upper rounding shell is pivotally attached to the rounding base at the second end thereof. Each of the upper rounding shells has a semi-circular inner surface of a dimension to conform to the nominal diameter of the pipe. The upper rounding shells are pivotally locked or latched around the pipe to capture and compress the pipe between the upper rounding shells and the rounding base. This serves to ensure that the pipe in the area to receive a fitting is straight and cylindrical so as to match a fitting that is to be applied to the pipe.

The main shafts each have lower ends that are attached to the upper rounding shells so that the main shafts are supported parallel to each other and spaced apart. The first and second main shafts are supported to the pipe in a common plane, that is preferably vertical, the plane including the pipe tubular axis. A housing is slidably supported on and positioned between the main shafts.

A hydraulic displaceable force piston extends downwardly from the housing intermediate the two main shafts. The force piston extends in the direction towards the pipe, and the force piston has means to releasably support a plastic fitting to be heat fused to the pipe. The housing carries two hydraulic actuated brakes that engage the first and second main shafts. Each of the brakes has a pivoted brake arm, that is, a brake arm having one end that is pivoted to the housing and an opposite free end that is in engagement with a main shaft. A hydraulic brake piston is supported by the housing for each of the brake arms. A fluid-filled hydraulic channel in the housing communicates the force piston with the brake pistons.

Positioned in the housing is an actuator piston having hydraulic fluid communication with the passageway. A threaded actuator shaft extends from the housing and has a manually operable knob. When an operator rotates the knob and thereby the threaded actuator shaft, the actuator piston is advanced or retracted. When the actuator piston is advanced, increased hydraulic pressure is applied to the fluid within the passageway to, in turn, apply hydraulic pressure to the brake pistons and force piston. The hydraulic pressure applied to the brake pistons forces the brake arms into increased contact with the main shafts to thereby lock the housing against upward displacement. The increased hydraulic force in the hydraulic fluid passageway that is applied to the force piston causes the force piston to simultaneously move downwardly to force a fitting into contact with the pipe.

When the manually operated knob is rotated in the reverse direction, retracting the actuator piston, the hydraulic force in the passageway decreases thereby allowing the force piston to retract to remove the pressure on the fitting and allowing the brake pistons to retract, relieving force on the brake arms to permit the housing to be manually elevationally positioned to disengage from the fitting after it has been fused to the exterior surface of the pipe.

An important improvement in the sidewall applicator of this invention is the means whereby the operator can, by rotating a single knob, apply brake pressure to lock the housing in position with respect to the main shafts and simultaneously apply downward pressure to force a fitting into contact with the pipe. Another important feature of the invention is the use of a rounding base and upper rounding shells arranged in such a way that the portion of a pipe to receive a fitting is held straight and in round condition. Plastic pipe, particularly if it has been used for a length of time, may become out of round, that is, where the cylindricality departs from the nominal cylindrical diameter of the pipe so that the external pipe wall would not conform to a fitting designed and manufactured to fit against a pipe wall of a nominal diameter of the pipe. By the use of the mounting mechanism of this invention, the cylindricality of the pipe is substantially returned to its nominal cylindrical diameter in the portion to receive a fitting to help ensure a more successful fusion bond of a fitting to the pipe wall.

Another important advantage of the sidewall applicator of this invention is the provision of an improved fitting holder that is detachably removable from the force piston and is readily adaptable by the use of selectable inserts to retain fittings having widely varying diameters.

The invention will be better understood by reference to the following detailed description and claims, taken in conjunction with the attached drawings.

DESCRIPTION OF THE PREFERRED EMBODIMENTS

Figure 1:
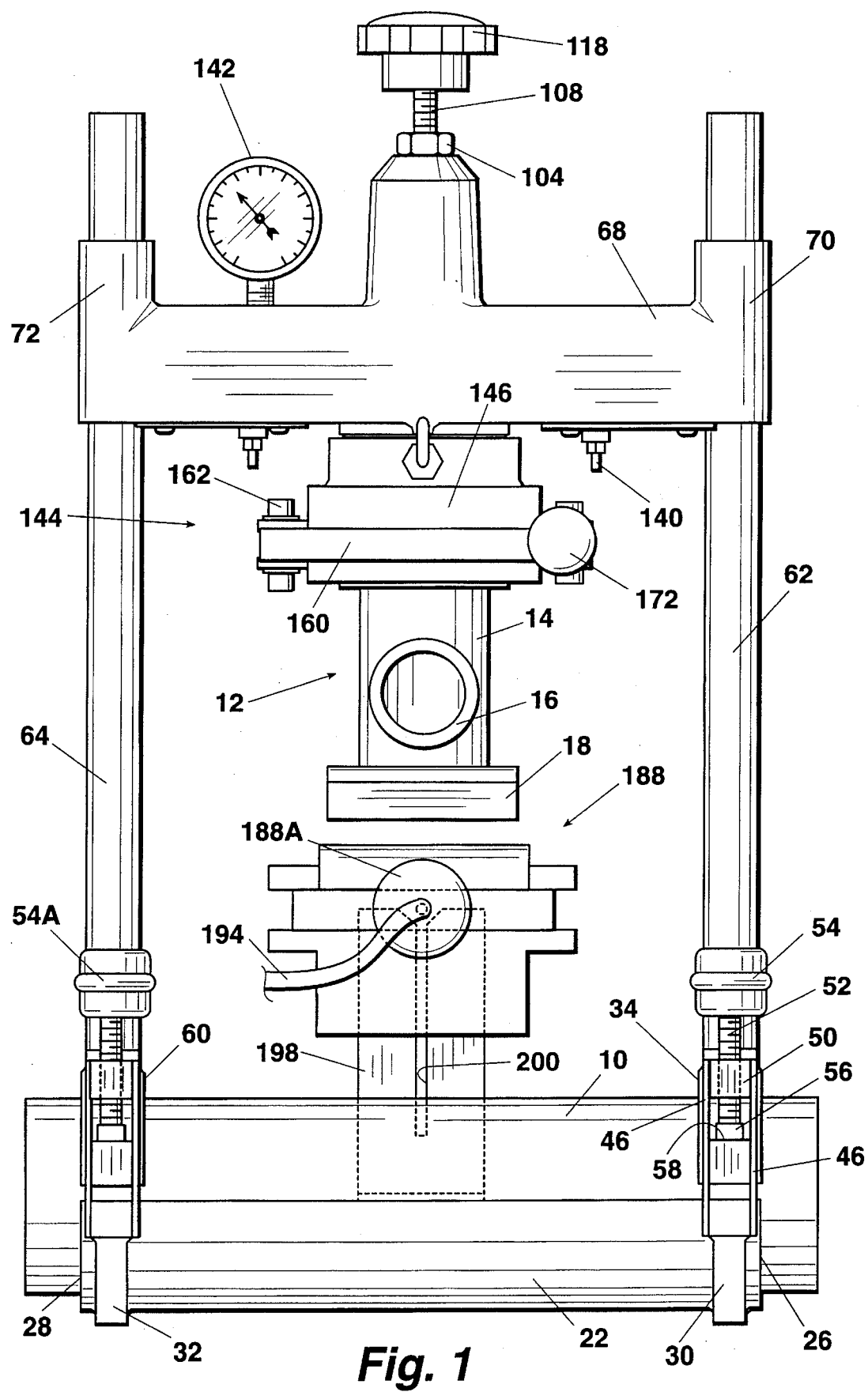
FIG. 1 is a front elevational view of a sidewall applicator of this invention mounted on a plastic pipe. The sidewall applicator retains a plastic fitting to be secured to the pipe. A heater platen is shown positioned between the plastic fitting and the pipe. The heater platen is of the type that is used to simultaneously heat the surface of the fitting and the surface of the plastic pipe to be joined.

Referring first to FIGS. 1, 2, 3 and 7, the major components of the sidewall applicator of this invention are shown. The purpose of the sidewall applicator is for attaching a fitting to a length of plastic pipe 10. Plastic pipe 10 may be new; however, the invention is particularly useful when attaching a fitting to pipe 10 that is in use. Frequently, pipe 10 will have been buried in the earth, such as for transmission of gas, water, crude oil, or any other liquids or gases, and therefore, pipe 10 may be out of round.

A plastic fitting to be attached to the wall of pipe 10 is indicated by the numeral 12. Such fittings may take a variety of shapes, but a typical fitting is generally in the form of a tee having a vertical cylindrical wall 14 with a branch outlet 16 and an integral base 18 with a fusion surface 20. The partial cylindrical fusion surface 20 is configured to match the external cylindrical surface of pipe 10. If pipe 10 is out of round, that is, has developed ovality or flatness or is not straight in the area where fitting 12 is to be applied, the fusion surface 20 will not match the exterior cylindrical surface of the pipe. One of the improvements of this invention is a means of restoring the cylindricality and straightening of pipe 10 in the area to receive a fitting so as to match surface 20 to thereby attain an improved seal.

Supported below pipe 10, and in contact with it, is an elongated rounding base 22. Rounding base 22 has, in cross-section perpendicular to its length, a semi-cylindrical interior surface 24 that contacts the external cylindrical surface of pipe 10.

Rounding base 22 has a first end 26 which is an integral lower rounding shell 30 and, in like manner, adjacent a second end 28 is a second integral lower rounding shell 32.

Figure 2:
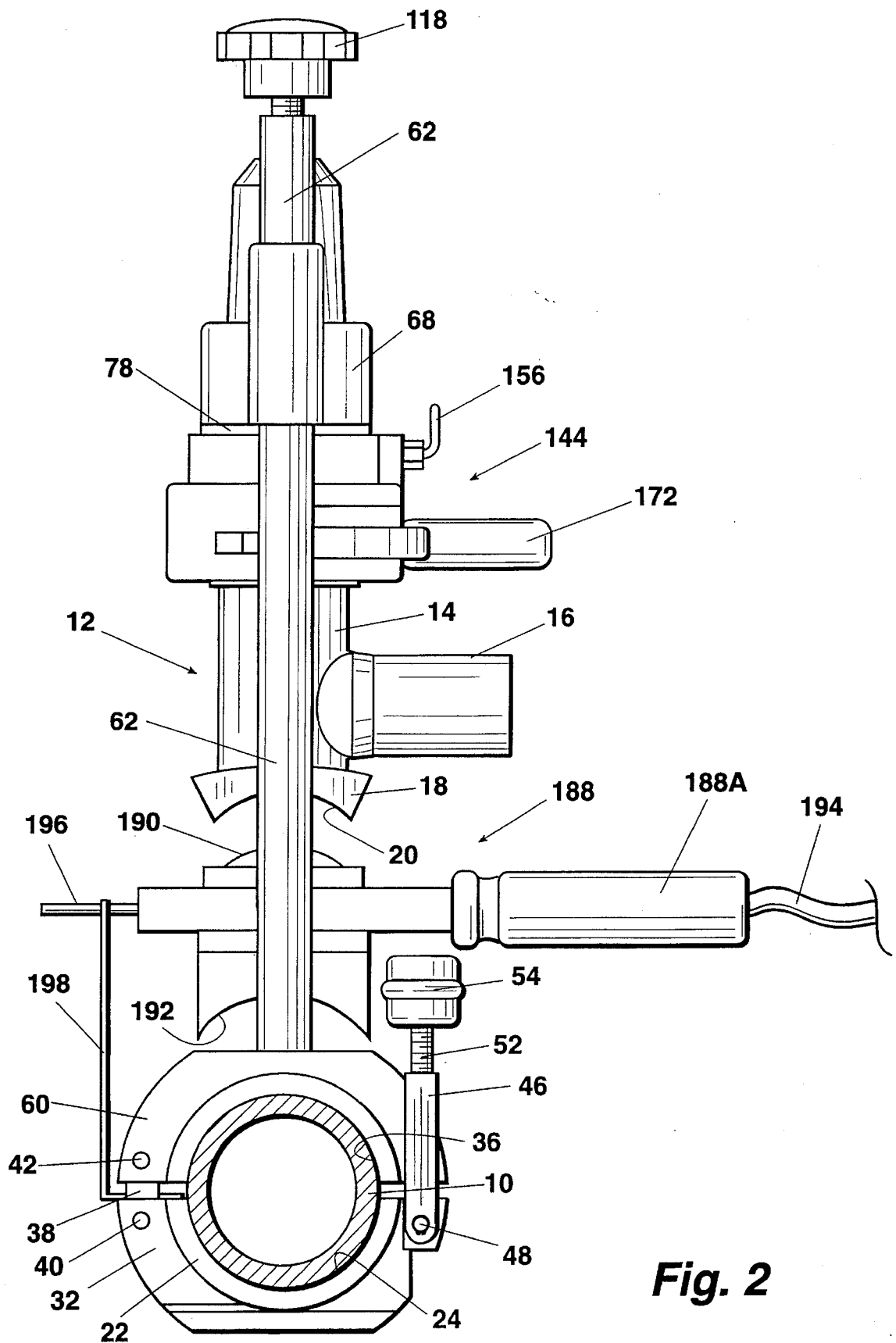
FIG. 2 is an elevational side view of the sidewall applicator of FIG. 1 showing the applicator retaining a fitting to be secured to the pipe and showing a heating platen as is customarily used for heating the fitting and the surface of the pipe to be joined.

As best seen in FIG. 2, pivotally attached to second lower rounding shell 32 is a second upper rounding shell 60 having an internal semi-cylindrical surface 36 that engages the exterior surface of pipe 10. Second upper rounding shell 60 is pivoted to the lower rounding shell 32 by means a link 38 and pivot pins 40 and 42.

As seen in FIGS. 1 and 2, a linkage arm 46 is pivotally attached to the lower rounding shell 32 by means of pin 48. Linkage arm 46 supports block 50 (See FIG. 1) that has an internally threaded opening receiving a threaded shaft 52 that receives at its upper end a knob 54. The lower end 56 of shaft 52 engages an outwardly extending surface 58 of first upper rounding shell 34. When knob 54 is tightened, first upper rounding shell 34 is drawn towards first lower rounding shell 30 to squeeze and clamp pipe 10. This has two functions. First, it securely holds the upper rounding shell 34 to the pipe and second, it causes pipe 10 to assume its nominal cylindricality.

Spaced above the second lower rounding shell 32 is a second upper rounding shell 60, as shown in FIG. 1. Second rounding shell 60 has the same components as has been described with reference to first rounding shell 34. When both the first and second rounding shells 34 and 60 are secured to lower rounding shells 30 and 32 that are a part of rounding base 22, the section of pipe 10 to receive a branch fitting is held straight and cylindrical.

Figure 7:
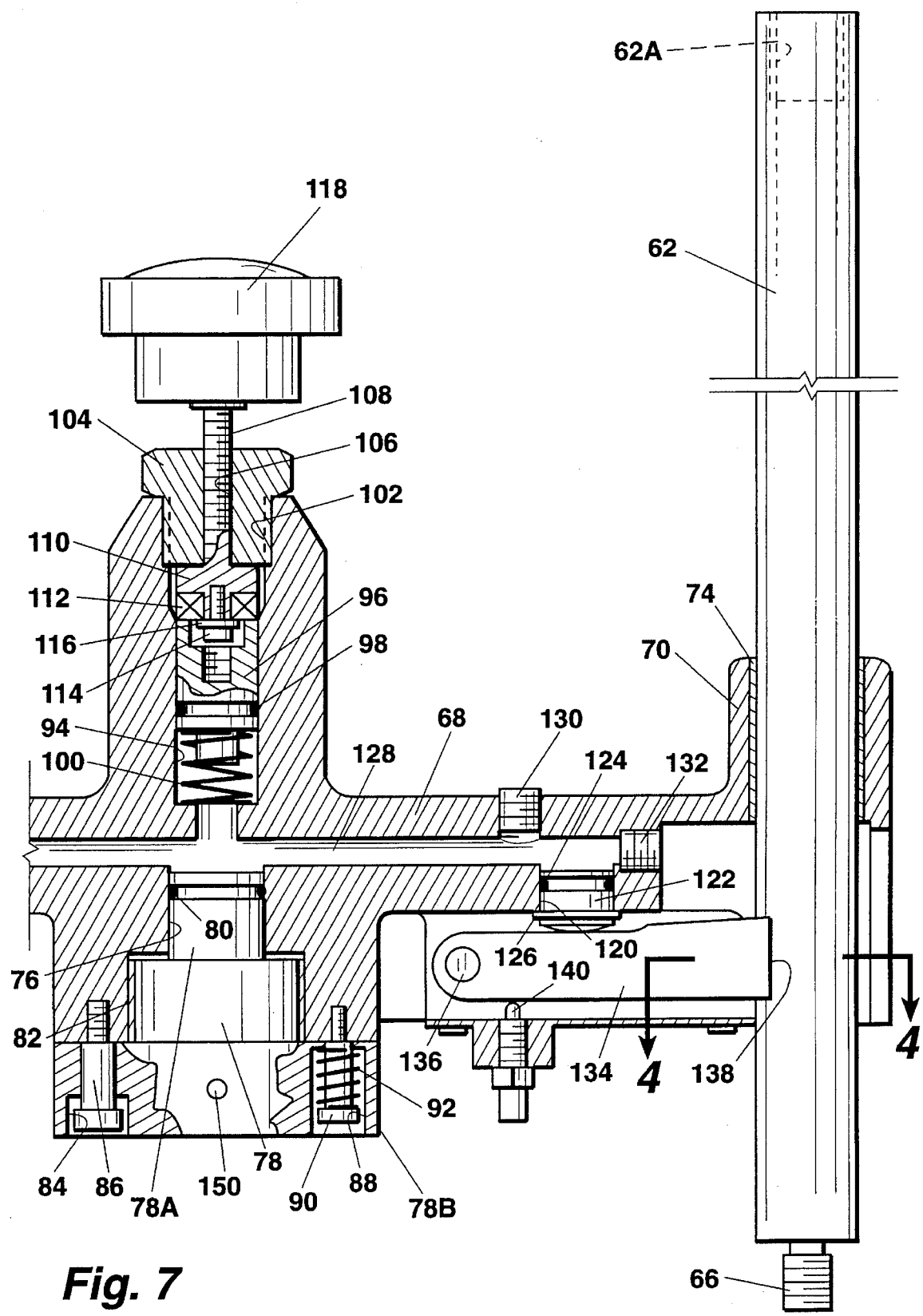
FIG. 7 is an enlarged scale fragmentary cross-sectional view of a portion of the sidewall applicator housing showing the hydraulic system as used to apply pressure on a fitting during fusion operation and simultaneously to the applicator brake system to lock the housing in fixed elevational position relative to the pipe.

Affixed to first upper rounding shell 34 is a first main shaft 62 and, in like manner, affixed to second upper rounding shell 60 is a second main shaft 64. Each of the rounding shells 34 and 60 are provided with internally threaded recesses (not seen) that receive a lower threaded portion 66 of the main shafts 62 and 64. FIG. 7 shows the lower threaded portion 66 of first main shaft 62, the upper rounding shell not being shown in this figure. The upper end of each of the main shafts 62 and 64 may be internally threaded, such as indicated by the numeral 62A in FIG. 7, so that extensions can be made to the main shafts 62 and 64 if necessary.

Main shafts 62 and 64 are supported in a common vertical plane that includes the tubular axis of pipe 10.

Positioned between main shafts 62 and 64 is an applicator housing 68. Housing 68 includes opposed tubular portions 70 and 72 that slidably receives main shafts 62 and 64 respectively. As shown in FIG. 7, tubular portion 70 includes a bushing 74 that slidably receives main shaft 62 to thereby hold housing 68 in secure but slidable relationship on the main shafts. Unless otherwise restrained, housing 68 can be manually raised and lowered away from and towards pipe 10 by an operator.

Housing 68 has four cylindrical cavities formed therein, three of which are seen in FIG. 7. The first is a force piston cavity 76 which slidably receives a force piston 78. More particularly, cavity 76 receives a reduced diameter portion 78A of force cylinder 78. The reduced diameter portion 78A functioning as a piston. Installed on piston 78A is an O-ring 80. Force piston 78 includes an increased diameter portion 78B that serves to receive a fitting holder, which will be described subsequently. The central portion of force piston 78 serves as a guide for the displacement of the piston, and, for this reason, a bushing 82 is positioned between it and the cylindrical recess in housing 68. The increased diameter portion 78B has at least two recesses 84 in the lower surface thereof, each of which receive a shoulder screw 86. The head of shoulder screw 86 serves to limit the downward displacement of force piston 78. In addition, other recesses, (at least two) one of which is seen in FIG. 7 and identified by the numeral 88, receive a shoulder screw 90 that supports a compression spring 92. The function of springs 92, only one of which is seen in FIG. 7, is to force piston 78 towards its upward, seated position. Piston 78 is forced downwardly by hydraulic pressure, compressing springs 92 in a manner that will be described subsequently.

Cylinder 94 in housing 68 receives an actuator piston 96 that has an O-ring 98 on its external surface. A compression spring 100 urges actuator piston 96 in the upward direction, except when it is forced downwardly in a manner to be subsequently described.

Positioned in a threaded opening 102 in the upper end of housing 68 is an adapter nut 104 having a threaded opening 106. A threaded shaft 108 is received in threaded opening 106 and has, at the lower end, an integral enlarged head portion 110 that supports a bearing 112. A cap screw 114 retains a washer 116 that retains bearing 112 in position against the threaded shaft head portion 110. Compression spring 100 retains actuator piston 96 in contact with bearing 112 at all times.

Affixed to the upper end of threaded shaft 108 is a handle 118 that is locked to the shaft so that when handle 118 is rotated, threaded shaft 108 rotates. Threaded shaft 108 is shown in its uppermost threaded position. When the operator rotates handle 118 clockwise, threaded shaft 108 is threadable downwardly advanced to, in turn, downwardly move actuator piston 96 to apply hydraulic pressure to components supported by housing 68.

Figure 3:
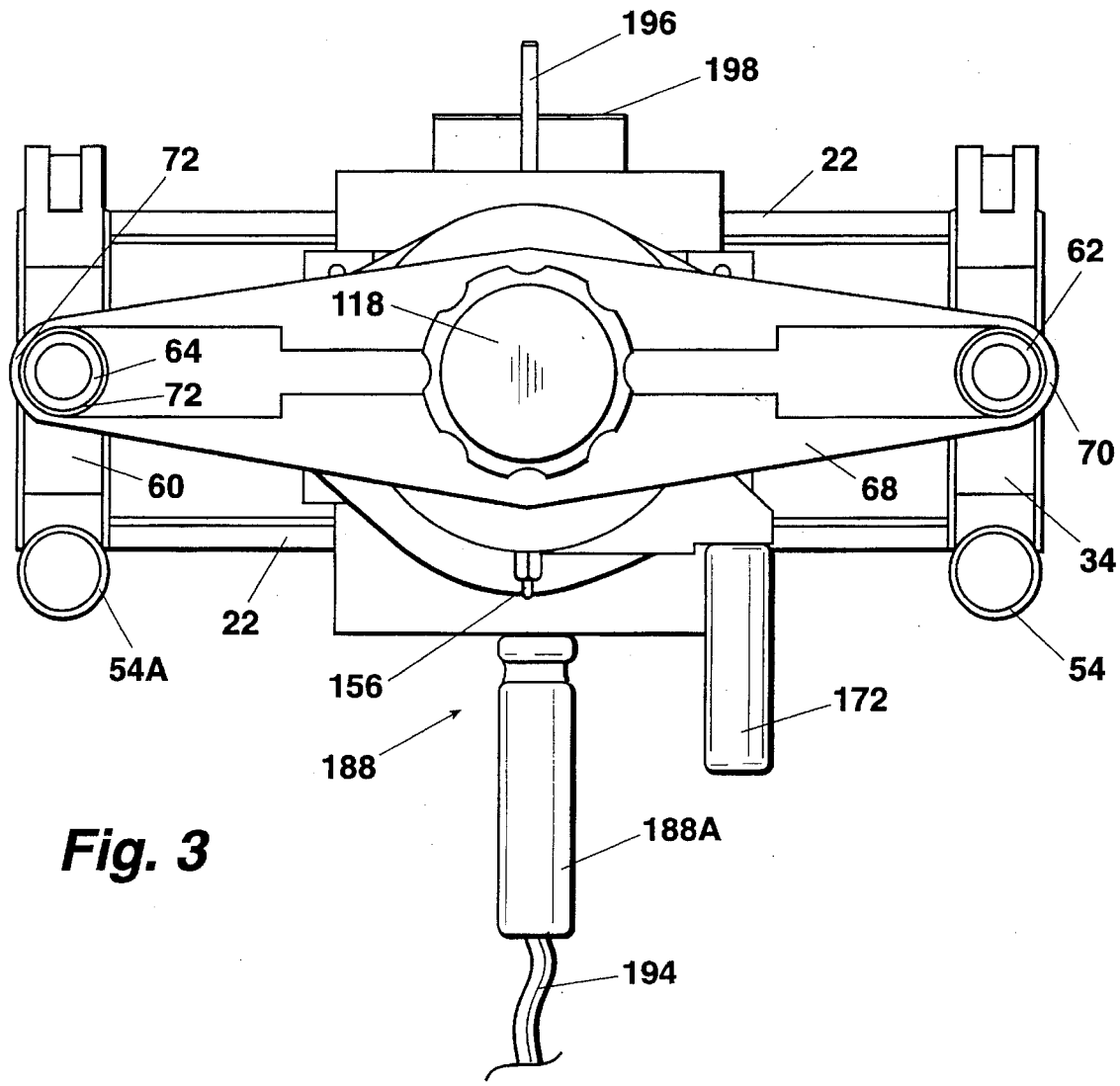
FIG. 3 is a top plan view of the sidewall applicator of FIGS. 1 and 2.

A third and fourth cylindrical cavity is formed in housing 68, only one of which is seen in FIG. 7, and is identified by the numeral 120. Cavity 120 is positioned adjacent to housing tubular portion 70 and although not seen, a similar cavity is positioned adjacent to housing tubular portion 72 as seen in FIGS. 1 and 3. Cavity 120 slidably receives a brake piston 122 that has an O-ring 124 thereon. A keeper ring 126 limits the upward displacement of piston 122.

A fluid passageway 128 within housing 68 provides communication between all of the described hydraulic cylinders, that is, between force piston cylinder 76, actuator piston cylinder 94, and the two brake piston cylinders 120, only one of which is seen in FIG. 7. Thus, by means of fluid passageway 128, hydraulic pressure is applied simultaneously to force piston 78A and brake pistons 122.

Passageways connecting with fluid passageway 128 are closed by plugs 130 and 132. Plugs, not seen, are similarly employed to close corresponding passageways, also not seen, in the opposite end of housing 68.

Figure 4:
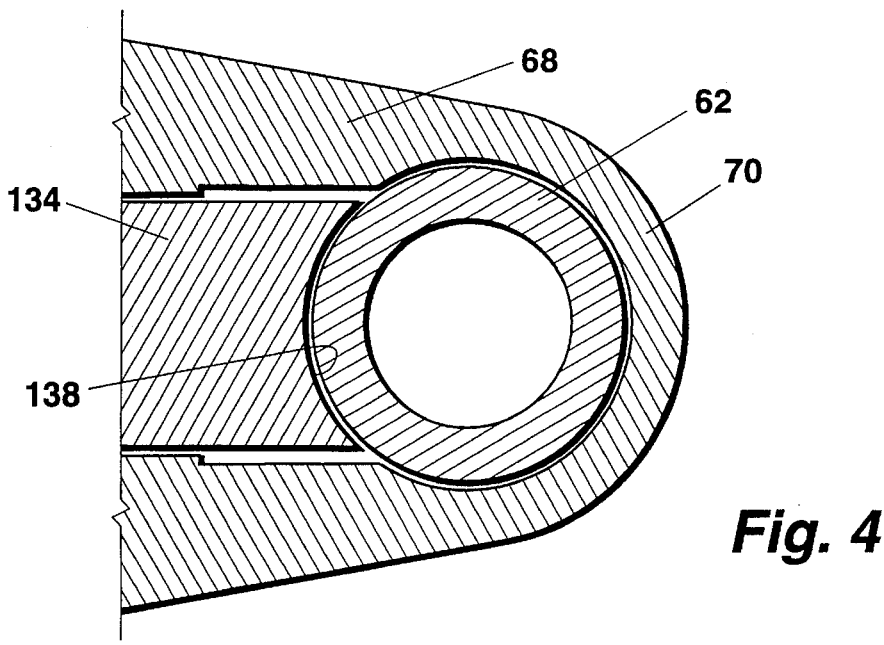
FIG. 4 is a highly enlarged fragmentary cross-sectional view taken along the line 4—4 of FIG. 7 showing the free outer end of a brake arm in relation to a main shaft which the brake arm contacts to lock the applicator housing in an elevational position with respect to the pipe.

An important part of the sidewall applicator of this disclosure is the hydraulic brake system which is best seen with reference to FIGS. 4 and 7. A brake arm 134 is pivoted at one end thereof to housing 68 by means of a pin 136. The outer end 138 of brake arm 134 is, as seen in FIG. 4, arcuately contoured to conform to the external cylindrical surface of main shaft 62. Brake arm 134 is so configured that when forced downwardly, that is, in the direction towards pipe 10, the brake arm more securely engages main shaft 62 to lock housing 68 with respect to main shaft 62. A similar brake arm and piston, not seen, are employed in the opposite end of housing 68 to releasable engage main shaft 64.

As seen in FIG. 7, a spring pin 140 resiliently urges brake arm 134 in the upward direction, that is, in the direction against brake piston 122.

When a fitting has been properly secured to the sidewall applicator, as will be described subsequently, and the fitting surface and the pipe surface have been heated to bring the surfaces to be fused to molten temperature, the operator moves housing 68 downwardly so that the fitting is in contact with the pipe. To apply the proper compressive force against the fitting and thereby the proper compressive force between the fitting and the pipe, the operator rotates handle 118. As handle 118 is rotated, actuator piston 96 is downwardly displaced, compressing hydraulic fluid in fluid passageway 128. This increased hydraulic pressure is applied concurrently to force piston 78 and to the two brake pistons 122, only one of which is seen. Thus, the rotation of handle 118 has two important and simultaneous functions. First, it forces the brake pistons 122 downwardly to move brake arms 134 downwardly into increase contact with main shafts 62 and 64 to thereby securely hold housing 68 in position. Second, the rotation of handle 118 simultaneously displaces forced piston 78 downwardly to apply pressure against the fitting. The amount of pressure applied against the fitting is determined by the hydraulic pressure in fluid passageway 128 which is indicated by a gauge 142, as seen in FIG. 1.

When the plastic components have been retained in position for a sufficient time to ensure that the molten surfaces have solidified to bond the fitting to the pipe, the operator can rotate handle 118 in the opposite direction, retracting threaded shaft 108 and thereby permitting spring 100 to urge actuator piston 96 in the upward direction, relieving hydraulic pressure in passageway 128. This, in turn, relieves hydraulic pressure on the brake pistons 122 and on force piston 78. Relief of pressure on force piston 78 relieves the pressure applied against the fitting, and release of the pressure on brake pistons 122 allows the operator to move housing 68 manually upwardly, sliding on main shafts 62 and 64.

Figure 5:
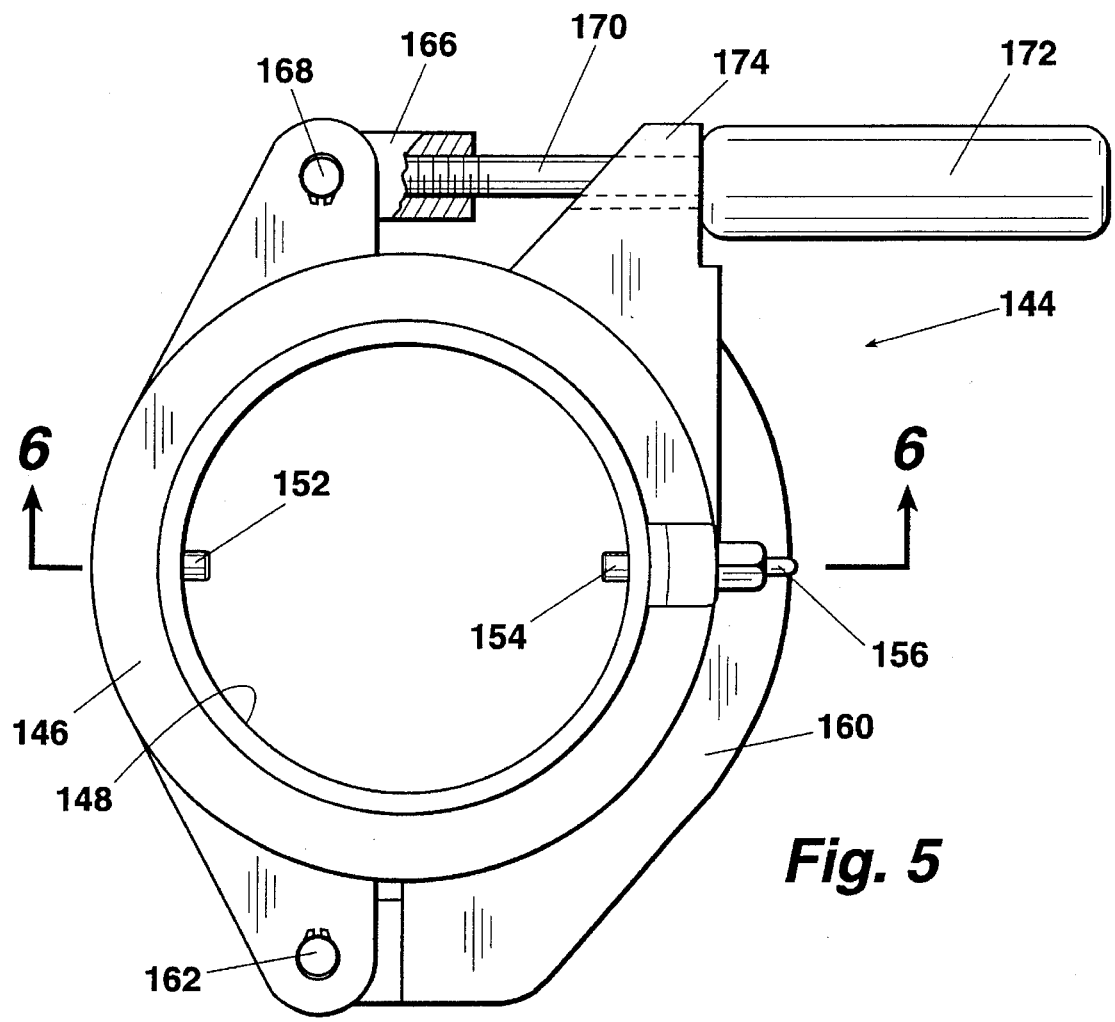
FIG. 5 is a top plan view of the removable fitting holder as used in the sidewall applicator. The fitting holder is shown in FIGS. 1, 2, and 3.
Figure 6:
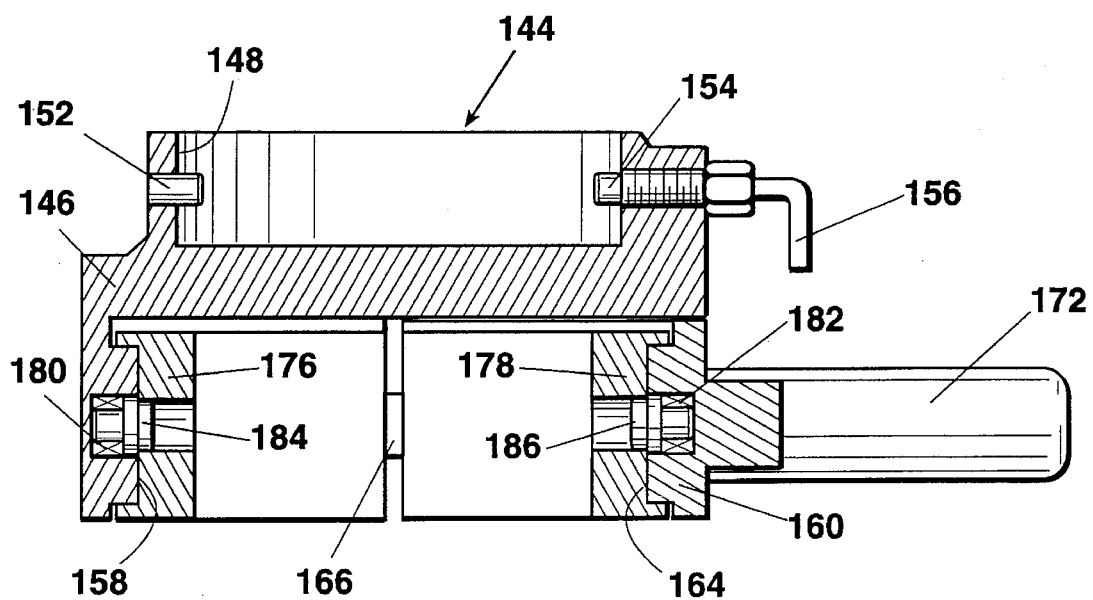
FIG. 6 is a cross-sectional view taken along the line 6—6 of FIG. 5 showing internal details of the fitting holder.

Another important feature of the sidewall applicator of this disclosure is the fitting holder 144, as seen in external views of FIGS. 1 and 2, in plan view in FIG. 5 and in cross-sectional view in FIG. 6. Fitting holder body 146 has an upper cylindrical recess 148 that telescopically receives the increased diameter portion 78B of force piston 78. Force piston enlarged diameter portion 78B has opposed small diameter recesses 150, one of which is seen in FIG. 7, .which may be in the form of a vertical slot. One recess 150 receives a pin 152 secured in fitting holder body 146, the pin protruding into cavity 148. Opposite pin 152 is a retractable spring plunger 154 having a handle 156. When handle 156 is manually outwardly moved, pin 152 can be positioned in opening 150 and the fitting holder body 146 moved into position on force piston portions 78B, after which handle 156 is released. Spring action within the spring plunger housing moves spring plunger 154 into locked position so that thereby the fitting holder 144 is removably secured to force piston 78.

The lower portion of fitting holder body 146 has a semi-circular recess 158. A fitting holder attachment portion 160 is pivotally supported to fitting holder body 146 by pin 162. Fitting holder attachment portion 160 has a semi-circular recess 164 that complements and completes recess 158 so that when the fitting holder attachment portion 160 is in closed position, as shown in FIGS. 5 and 6, a substantially circular enclosure is provided in the lower portion of fitting holder body 146.

As seen in FIG. 5, fitting holder body 146 pivotally receives a clamp nut 166 about a pin 168. Clamp nut 166 has an internal threaded opening that receives the threaded end portion of a locking shaft 170 that has, on its outer end, a handle 172. Fitting holder attachment portion 160 has integral outward extending fork portion 174 that slidably receives locking shaft 170. When handle 172 is rotated to threadably outwardly advance shaft 170, the handle 172 and shaft 170 may be pivoted about pin 168 to disengage from locking portion 174 to thereby enable fitting holder attachment portion 160 to be pivoted with respect to fitting holder body 146 and to thereby permit a fitting 12 to be positioned within holder 144.

To adapt fitting holder 144 to a variety of different sizes of plastic fittings to be mounted on pipe 10, provision is made for the placement of liner semi-tubular portions 176 and 178 within fitting holder body semi-circular recesses 158 and 164 respectfully. To retain the semi-tubular liners 176 and 178 in position, permanent magnets 180 and 182 are positioned in semi-circular recesses 158 and 164. A pair of magnetic inserts 184 and 186 are attached to liner semi-tubular portions 176 and 178. This permits the liners to be expeditiously attached to or removed from fitting holder body 146 and pivoted portion 160 so that plastic fittings having various diameters may be grasped by the fitting holder in the process of attaching the fitting to a pipe.

FIGS. 1 and 2 show the process involved in attaching a fitting 12 to pipe 10. Each of these views show a fitting 12 retained at its upper end by fitting holder 144 which, in turn, is secured to force piston 78 (hidden in FIGS. 1 and 2). An electrical heater, generally indicated by the numeral 188, is positioned between pipe 10 and fitting 12. Heater 188 has an upper convex surface 190 configured to conform to the fitting fusion surface 20 and a lower concave surface 192 configured to conform to the surface of pipe 10. Heater 188 is supplied by an electric cord 194 and has a guide pin 196 extending from it. A guide template 198 having a slot 200 therein is attached to rounding base 22 midway between lower rounding shells 30 and 32. Slot 200 serves as a guide slot for manually positioning heater 188.

Heater 188 is illustrated for purposes only of disclosing the method of using the invention. The invention is not related to heater 188 since such devices are well known in the industry and no uniqueness is claimed with respect to heater 188 in this disclosure.

To install fitting 12 onto pipe 10, the fitting is first attached to fitting holder 144 which then is attached to force piston 78 in the manner previously described. Heater 188 is positioned between fitting 12 and pipe 10, and housing 68 is manually lowered so that heater concave surface 192 contacts pipe 10 and fitting fusion surface 20 contacts the heater upper convex surface 190. The housing is left in this position until the fusion surface 20 of the fitting and the area of the pipe to receive the fitting are raised in temperature to the melting point. After this has been achieved, the operator manually lifts housing 68 to the position as shown in FIGS. 1 and 2 by means of handle 188A and heater 188 is removed. Subsequently, the operator immediately lowers housing 68 so that fitting fusion surface 20, now in a molten state, contacts the surface on pipe 10, which is also in a molten state. The operator then rotates handle 118 to create hydraulic pressure in passageway 128 that is simultaneously applied to force piston 78 and to brake pistons 122. As previously described, this locks the housing with respect to main shafts 62 and 64 and simultaneously applies downward movement of force piston 78 to force fitting 12 into contact with pipe 10, the amount of force being indicated by gauge 142. The operator selects the amount of force depending upon the type and size of the fitting, the characteristics of the plastics being fused and so forth.

The operator, after achieving the desired physical force between the fitting and the pipe by rotation of handle 118 and as indicated in gauge 142, maintains the components in such condition for a preselected time until fusion has been completed, that is, until the molten surfaces have formed an integral relationship. After complete fusion has occurred and the heated surface cooled so that all portions of the plastic components are in a solid state, the operator rotates handle 118 in the counter-clockwise direction, retracting actuator piston 96, relieving pressure on force piston 78 and brake pistons 122 allowing the operator to raise housing 68. Before raising housing 68, fitting holder handle 172 is rotated to release fitting holder attachment portion 160 and to thereby allow the attachment holder to be moved freely away from fitting 12. The sidewall application of a fitting to a pipe has been completed. The operator may then rotate knobs 54 and 54A to release the upper rounding shells 34 and 60 from attachment to lower rounding shells 30 and 32 and thereby allow the entire sidewall applicator to be removed from the pipe.

Figure 8:
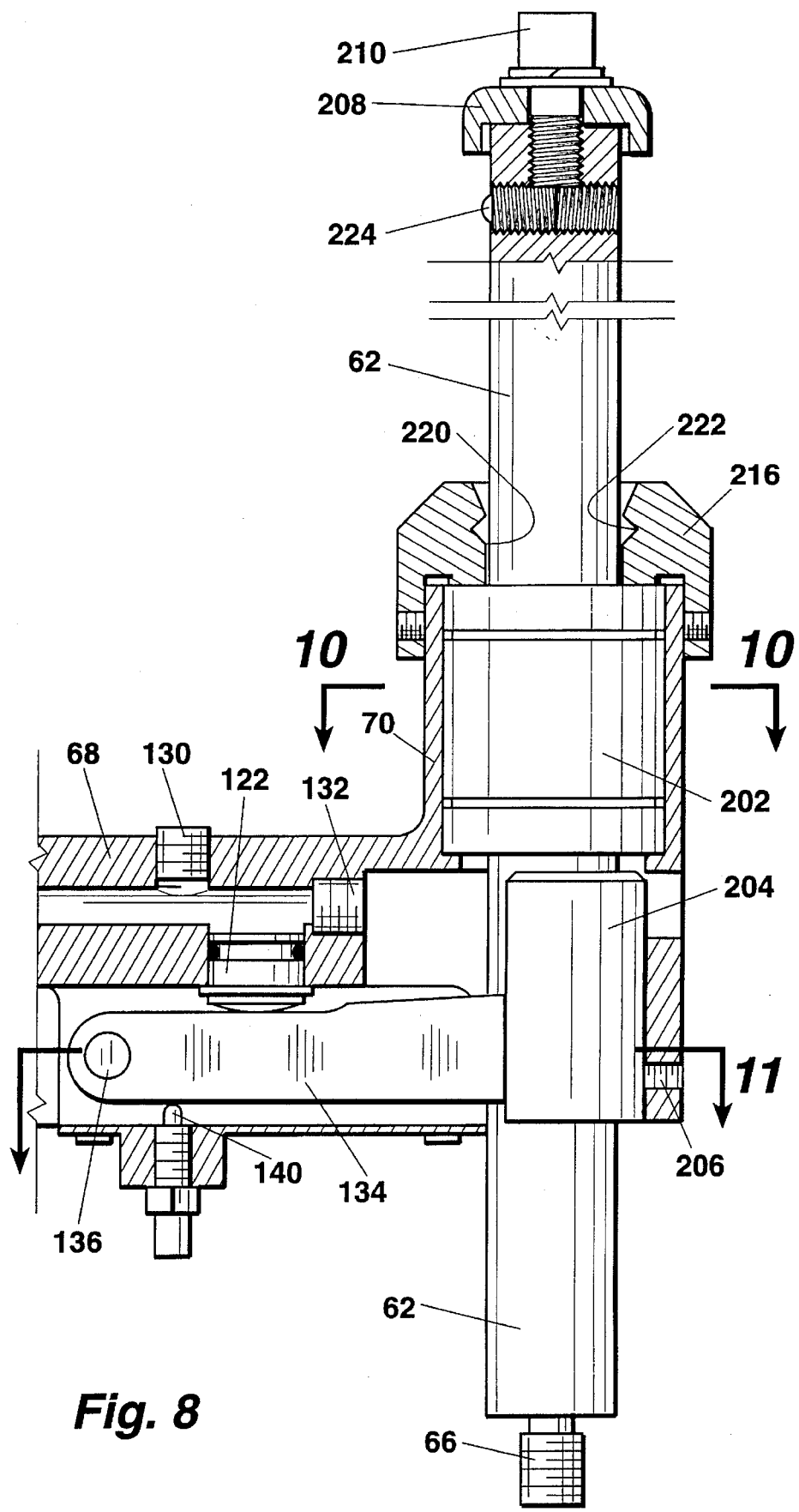
FIG. 8 is a fragmentary cross-sectional view of a portion of the sidewall applicator housing showing alternate design features and particularly, showing more details of the arrangement for supporting bushings within the housing and providing means to retain the housing in its furthermost upward position to facilitate attaching and detaching the sidewall applicator to a pipe.

FIGS. 8 through 11 show a slightly alternate embodiment of the invention. As seen in FIG. 8, a linear ball bearing 202 is used to slideably receive first main shaft 62. Linear ball bearing 202 replaces bushing 74 as seen in FIG. 7. In addition, a bushing 204 is received by housing 68, the bushing partially surrounding first main shaft 62. Bushing 204 serves as a backup against the force of brake arm 134.

Linear ball bearing 202 and bushing 204 serve to guide the housing on shaft 62, it being understood that similar elements are used at the opposite end of the housing to slidably receive second main shaft 64. A threaded opening 206 may receive a set screw or similar device for retaining bushing 204 in position within housing 68.

Figure 9:
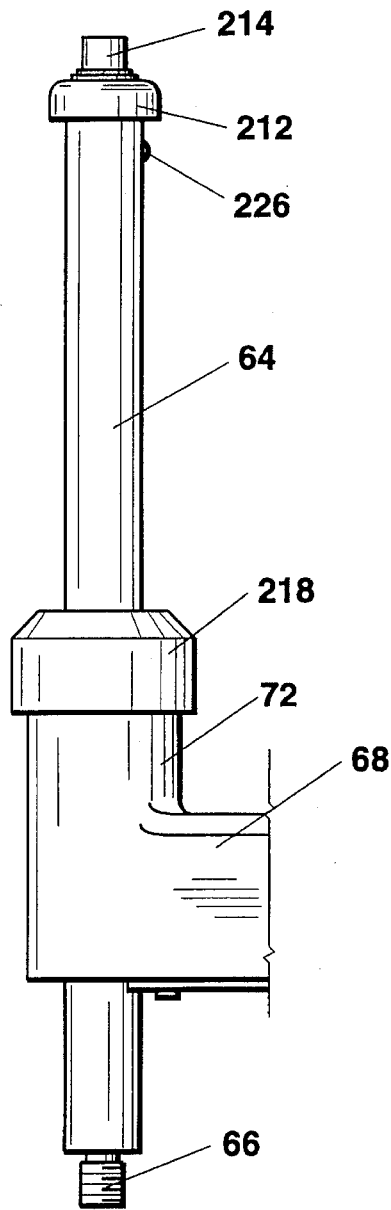
FIG. 9 is a reduced scale external view of the end of the housing opposite to that shown in FIG. 8 and showing the second main shaft with means at the upper end for releasably supporting the housing in its furthermost upward position.
Figure 10:
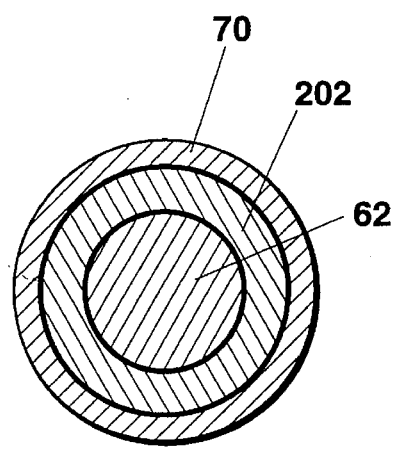
FIG. 10 is a cross-sectional view taken along the line 10—10 of FIG. 8.
Figure 11:
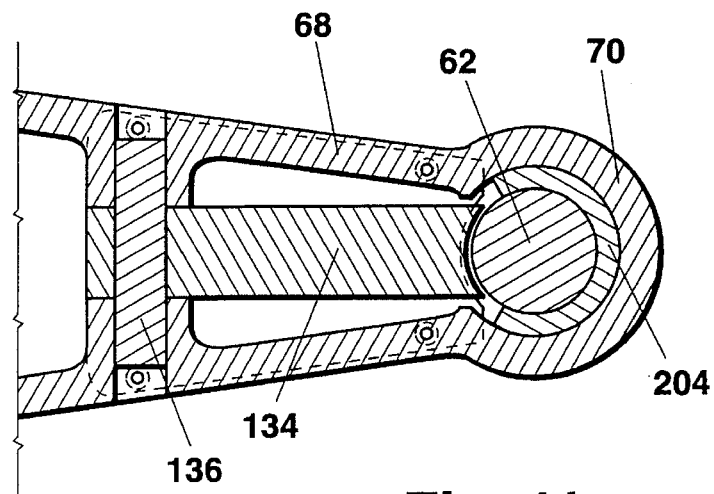
FIG. 11 is a fragmentary cross-sectional view taken along the line 11—11 of FIG. 8 showing the arrangement of the brake arm in relationship to the housing in the embodiment of FIG. 8.

Positioned on the upper end of first main shaft 62 is a stop plate 208 held in position by a bolt 210. As shown in FIG. 9, a second stop plate 212 held in place by second bolt 214 is secured to the upper end of the second main shaft 64. Stop plates 208 and 210 serve to prevent housing 68 from being inadvertently moved off of the main shafts 62 and 64.

As shown in FIG. 8, there is affixed to the upper end of the tubular portion 70 of housing 68, a bearing retainer cap 216 and, in like manner, as shown in FIG. 9, there is illustrated a bearing retainer cap 218. Bearing retainer caps 216 and 218 each has two basic functions. First, as the term implies, they serve to retain the linear ball bearing (only linear ball bearing 202 being shown) in position within the tubular upwardly extending portions of housing 68. A second function of bearing retainer caps 216 and 218 is to retain housing 68 in an upper position with respect to main shafts 62 and 64 while the operator is installing the sidewall applicator onto or removing it from a pipe. That is, bearing retainer caps 216 and 218 assist in keeping housing 68 up and out of the way while the operator is concerned with properly positioning and securing the applicator to a pipe in preparation for attaching a fitting to the pipe. To achieve this purpose, each of the bearing retainer caps 216 and 218 has an internal opening 220 therethrough, only the opening in cap 216 being shown. The internal opening 220 slidably receives shaft 62. Formed as a part of internal opening 220 is an internal groove 222. Positioned in each of main shafts 62 and 64, adjacent the upper ends thereof, and below the stop caps 208 and 212 respectively, are detents 224 and 226. Detents 224 and 226 provides depressably outwardly extending balls that, when housing 68 is moved to its uppermost position with respect to the shafts, enter into internal groove 222 in bearing retainer cap 216 and a similar groove in bearing retainer cap 218.

When the operator wishes to move housing 68 upwardly and out of the way of the lower portion of the sidewall applicator, he merely physically moves housing 68 upwardly until detents 224 and 226 engage grooves in bearing retainer caps 216 and 218. The housing will stay in the upward position until the operator applies force on the housing to depress the detents and thereby move it downwardly into an operating position.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A sidewall applicator for heat fusion of a plastic fitting to the exterior cylindrical surface of a plastic pipe in which a surface of the fitting and a portion of the cylindrical surface of the pipe in the area thereof to which said fitting is to be attached is heated, the applicator comprising:

a first and a second main shaft each having a lower end;

means to detachably support said main shafts to the exterior of a pipe whereby said main shafts are spaced apart and parallel to each other and in a common vertical plane that includes the axis of said pipe;

a housing slidably supported by and positioned between said main shafts;

a hydraulically displaceable force piston extending from said housing in the direction towards the pipe, the force piston having means to releasably support a plastic fitting to be heat fused to the pipe;

hydraulically actuated brake means carried by said housing and releasably engaging said main shafts;

an actuator piston in closed communication with a fluid filled passageway within said housing, the fluid passageway being in communication with said brake means and said force piston; and means to displace said actuator piston to apply hydraulic pressure to said fluid filled passageway to simultaneously actuate said brake means to secure said housing to said main shafts and to downwardly displace said force piston to force said plastic fitting against said pipe.

2. A sidewall applicator according to claim 1 wherein said hydraulically actuated brake means comprises:

a first brake arm having a first end pivotally attached to said housing and a second end in engagement with said first main shaft, the brake arm being pivoted in a first direction to more securely engage said first main shaft and being pivoted in an opposite second direction to less securely engage said main shaft;

a first brake cylinder formed in said housing adjacent said first brake arm and having communication with said fluid filled passageway; and a first brake piston received in said brake cylinder and having an outer surface in engagement with said brake arm whereby increased hydraulic pressure in said fluid filled passageway displaces said brake piston to pivot said brake arm in said first direction to more securely engage said first main shaft.

3. A sidewall applicator according to claim 2 wherein said hydraulically actuated brake means comprises:

a second brake arm having a second end in engagement with said second main shaft, a second brake cylinder and a second brake piston whereby braking action is obtained against both said first and second main shafts upon increased hydraulic pressure in said fluid filled passageway.

4. A sidewall applicator according to claim 1 wherein said housing has an actuator cylindrical opening therein in communication with said fluid filled passageway and with the exterior of said housing, said actuator piston being displaceably received in said actuator cylindrical opening and wherein said means to displace said actuator piston comprises:

an actuator nut threadably received in said actuator cylindrical opening and having a threaded central passageway therethrough;

a threaded shaft received in said threaded central passageway having an inner end in engagement with said actuator piston and an outer end extending externally of said actuator nut and of said housing;

a manually actuatable knob affixed to said threaded shaft outer end whereby an operator can rotate said knob and thereby said threaded shaft to advance or retract said actuator piston.

5. A sidewall applicator for heat fusion of a plastic fitting to the exterior pipe having a nominal external diameter, the applicator having means to ensure cylindricality of the pipe in the area thereof to receive a fitting comprising:

an elongated rounding base having, in cross-section perpendicular to its length, a semi-circular interior surface of a dimension conforming to said nominal external diameter of said pipe, the rounding base having opposed first and second ends, the rounded base being supported in contact with and beneath a portion of said pipe that is to receive a fitting;

a first upper rounding shell pivotally attached to said rounding base at said first end thereof;

a second upper rounding shell pivotally attached to said rounding base at said second end thereof, said upper rounding shells each having a semi-circular inner surface of a dimension to conform to the nominal diameter of said pipe;

means to compressibly clamp said pipe between said rounding base and said first and second upper rounding shells to cylindrically conform said pipe external surface;

an applicator housing supported to and above said first and second rounding shells and above said rounding base;

means to apply heat to said fitting and to said pipe in an area thereof to receive said fitting above said base and between said upper rounding shells;

a hydraulically displaceable force piston extending from said housing in the direction towards the pipe, the force piston having means to releasably support a plastic fitting to be heat fused to the pipe;

hydraulically actuated brake means carried by said housing and releasably engaging said main shafts;

an actuator piston in closed communication with a fluid filled passageway within said housing, the fluid passageway being in communication with said brake means and said force piston; and means to displace said actuator piston to apply hydraulic pressure to said fluid filled passageway to simultaneously actuate said brake means to secure said housing to said main shafts and to downwardly displace said force piston to force said plastic fitting against said pipe.

6. A sidewall applicator for heat fusion of a plastic fitting to the exterior cylindrical surface of a plastic pipe in which a surface of the fitting and a portion of the cylindrical surface of said pipe in the area thereof to which said fitting is to be attached is heated, the applicator comprising:

a housing having a downwardly displaceable force piston;

support means secured to said pipe providing means to mount said housing above a portion of said pipe that is to receive said fitting, said support means providing means to elevationally position said housing with respect to said pipe;

a force piston downwardly extending from said housing;

a fitting holder body having attachment means at an upper end portion to removably attach to said force piston whereby the fitting holder body is moved vertically by said force piston; and a fitting holder attachment portion pivotally secured to a lower portion of said fitting holder body, the attachment portion being pivotal in a first direction to accept an upper portion of a fitting and pivotal in a second direction to clamp said upper portion of said fitting between said fitting holder body and said fitting holder attachment portion to secure said fitting for fusion to said pipe.

7. A sidewall applicator according to claim 6 including:

a liner providing means to adapt said fitting holder to accept a different size fitting, the liner being formed of a first and second liner half, the liner first half being removably attachable to said fitting holder body and the liner second half being removably attachable in said fitting holder attachment portion.

8. A sidewall applicator according to claim 7 wherein said liner first half and said liner second half are each removably attachable by means of a first magnet mounted in said fitting holder body and a second magnet mounted in said fitting holder attachment portion.

9. A sidewall applicator for heat fusion of a plastic fitting to the exterior cylindrical surface of a plastic pipe in which a surface of the fitting and a portion of the cylindrical surface of the pipe in the area thereof to which said fitting is to be attached is heated, the applicator comprising:

a plurality of spaced apart shafts each having a lower end;

means to detachably support said shafts to the exterior of a pipe;

a housing slidably supported by said shafts;

a hydraulically displaceable force piston extending from said housing in the direction towards the pipe, the force piston having means to releasably support a plastic fitting to be heat fused to the pipe;

a hydraulically actuated brake carried by said housing and releasably engaging at least one of said shafts;

a hydraulic pressure applicator in communication with a fluid filled passageway within said housing, the fluid passageway being in communication with said hydraulically actuated brake and said force piston; and means to control said hydraulic pressure applicator to apply hydraulic pressure to said fluid filled passageway to simultaneously actuate said hydraulically actuated brake to secure said housing to said shafts and to downwardly displace said force piston to force said plastic fitting against said pipe.

* * * * *